United States Patent
Fukuyama

(10) Patent No.: US 10,318,424 B2
(45) Date of Patent: *Jun. 11, 2019

(54) INFORMATION PROCESSING DEVICE

(71) Applicant: NEC Corporation, Minato-ku, Tokyo (JP)

(72) Inventor: Tomohisa Fukuyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/850,083

(22) Filed: Dec. 21, 2017

(65) Prior Publication Data
US 2018/0225208 A1 Aug. 9, 2018

(30) Foreign Application Priority Data

Feb. 7, 2017 (JP) .................................. 2017-020049

(51) Int. Cl.
*G06F 12/08* (2016.01)
*G06F 12/0817* (2016.01)
*G06F 12/0875* (2016.01)
*G06F 9/30* (2018.01)
*G06F 12/0808* (2016.01)
*G06F 15/76* (2006.01)

(52) U.S. Cl.
CPC ...... *G06F 12/0828* (2013.01); *G06F 9/30043* (2013.01); *G06F 12/0808* (2013.01);
(Continued)

(58) Field of Classification Search
CPC .... G06F 12/0828; G06F 12/08; G06F 12/084; G06F 9/30043; G06F 12/0808; G06F 12/0875; G06F 15/76; G06F 2212/452; G06F 2212/621; G06F 2212/222; G06F 2212/69; G06F 2212/314; G06F 2212/622; G06F 11/36; G06F 9/526; G06F 12/0815; G06F 9/50; G06F 12/0837;
(Continued)

(56) References Cited

U.S. PATENT DOCUMENTS 6,839,808 B2 * 1/2005 Gruner ................ G06F 12/0813
711/122
7,206,922 B1 * 4/2007 Steiss .................... G06F 9/3802
711/151

(Continued)

FOREIGN PATENT DOCUMENTS

JP 5811245 B1 11/2015

*Primary Examiner* — Mano Padmanabhan
*Assistant Examiner* — Jean C Edouard

(57) ABSTRACT

On receiving a Store instruction from a Release side processor, a shared memory transmits a cache invalidation request to an Acquire side processor, increases the value of an execution counter, and transmits the count value to the Release side processor asynchronously with the receiving of the Store instruction. The Release side processor has: a store counter which increases its value when the Store instruction is issued and, when the count value of the execution counter is received, decreases its value by the count value; and a wait counter which, when the store counter has come to indicate 0, sets a value indicating a predetermined time and decreases its value every unit time. The Release side processor issues a Store Fence instruction to request for a guarantee of completion of invalidation of the cache of the Acquire side processor when both the counters have come to indicate 0.

11 Claims, 13 Drawing Sheets

(52) U.S. Cl.
CPC .......... *G06F 12/0875* (2013.01); *G06F 15/76* (2013.01); *G06F 2212/452* (2013.01); *G06F 2212/621* (2013.01)

(58) Field of Classification Search
CPC .... G06F 11/3636; G06F 9/544; G06F 9/5066; G06F 12/0811; G06F 12/06; G06F 9/3004; G06F 12/00
USPC ........................................................ 711/125
See application file for complete search history.

(56) References Cited

U.S. PATENT DOCUMENTS

| | | |
|---|---|---|
| 9,606,923 B2 | 3/2017 | Fukuyama |
| 2004/0117564 A1* | 6/2004 | Grenholm ........... G06F 12/0815 711/150 |
| 2009/0254710 A1* | 10/2009 | Nonogaki ........... G06F 12/0893 711/133 |
| 2010/0042771 A1* | 2/2010 | Kawaguchi ......... G06F 12/0808 711/5 |
| 2010/0180085 A1* | 7/2010 | Dave ................... G06F 12/0831 711/146 |
| 2013/0254488 A1* | 9/2013 | Kaxiras ............... G06F 12/0815 711/130 |
| 2014/0282564 A1* | 9/2014 | Almog .................... G06F 9/522 718/102 |
| 2014/0289480 A1* | 9/2014 | Koike ................. G06F 12/0804 711/143 |
| 2014/0297957 A1* | 10/2014 | Aoyagi ............... G06F 12/0804 711/120 |
| 2015/0286586 A1* | 10/2015 | Yadav .................... G06F 9/528 711/152 |

\* cited by examiner

INFORMATION PROCESSING DEVICE

INCORPORATION BY REFERENCE

This application is based upon and claims the benefit of priority from Japanese patent application No. 2017-020049, filed on Feb. 7, 2017, the disclosure of which is incorporated herein in its entirety by reference.

TECHNICAL FIELD

The present invention relates to an information processing device, a memory order guarantee method, and a program.

BACKGROUND ART

There is a computer architecture which has a memory shared by a plurality of processors (i.e., a shared memory) and employs a directory-based protocol in coherence control. Patent Document 1 discloses an example of an information processing device which guarantees the global visibility of an invalidation request to an Acquire side processor at the time of a memory order guarantee based on a release consistency model in the abovementioned architecture.

The information processing device disclosed by Patent Document 1 has a plurality of processors, a shared memory, and a network connecting the processors with the shared memory. Each of the processors includes a cache, a memory access control part controlling an access by the processor to the shared memory, and an invalidation request control part executing a cache invalidation process on the basis of an invalidation request by the shared memory. The shared memory transmits a cache invalidation request to the invalidation request control part of an acquire side processor retrieving data, on the basis of a Store instruction by a Release side processor writing data, and transmits an Ack (acknowledgment) representing that the Store instruction has been correctly received to the release side processor.

The memory access control part of the Release side processor has a store counter which is incremented when issuing a Store instruction to the shared memory and is decremented when receiving an Ack representing that a Store instruction has been correctly received from the shared memory, and a wait counter which, when the store counter is decremented to 0, is set to a value representing a predetermined time and is decremented every unit time. When the store counter and the wait counter are decremented to 0, the memory access control part of the Release side processor issues a Store Fence instruction to request the guarantee of completion of invalidation of the cache of the Acquire side processor.

After the cache invalidation process is completed on the basis of the invalidation request by the shared memory, the memory access control part of the Acquire side processor issues a Load Fence instruction to guarantee completion of invalidation of the cache in response to the Store Fence instruction.

Patent Document 1: U.S. Pat. No. 9,606,923. B2(JP Patent 5,811,245 B)

In the information processing device disclosed by Patent Document 1, the shared memory transmits a cache invalidation request to the invalidation request control part of the Acquire side processor retrieving data, on the basis of a Store instruction by the Release side processor writing data, and transmits an Ack representing that the Store instruction has been correctly received to the Release side processor. Because one Ack is returned every time one Store instruction is executed, there is a problem that load on the network connecting the plurality of processors with the shared memory is heavy.

SUMMARY OF THE INVENTION

An object of the present invention is to provide an information processing device which solves the abovementioned problem.

An information processing device as an aspect of the present invention is an information processing device having a plurality of processors, a shared memory, and a network connecting the plurality of processors with the shared memory.

Each of the processors includes a cache, a memory access control unit configured to control an access from the processor to the shared memory, and an invalidation request control unit configured to execute an invalidation process on the cache on a basis of an invalidation request by the shared memory.

The shared memory has an execution counter configured to count a number of completed Store instructions.

The shared memory is configured to: on receiving a Store instruction issued by the processor on a Release side which writes data, transmit a request for invalidation of the cache to the invalidation request control unit of the processor on an Acquire side which reads data and also increase a value of the execution counter; and transmit a count value of the execution counter to the Release side processor asynchronously with the receiving of the Store instruction.

The memory access control unit of the Release side processor includes a store counter and a wait counter. The store counter is configured to increase its value when a Store instruction is issued to the shared memory and, when a count value of the execution counter is received from the shared memory, decrease its value by the count value of the execution counter. The wait counter is configured to, when the store counter has come to indicate 0, set a value indicating a predetermined time and decrease its value every unit time. The predetermined time is set so that a time from writing of a flag into the shared memory by the Release side processor after the predetermined time to reading of the flag by the Acquire side processor becomes larger than a time from transmission of the invalidation request by the shared memory to completion of the invalidation process on the cache in the Acquire side processor.

The memory access control unit of the Release side processor is configured to issue a Store Fence instruction to request for a guarantee of completion of invalidation of the cache of the Acquire side processor when the store counter and the wait counter have come to indicate 0.

The memory access control unit of the Acquire side processor is configured to, after completion of the invalidation process on the cache on a basis of the invalidation request by the shared memory, issue a Load Fence instruction to guarantee completion of invalidation of the cache in response to the Store Fence instruction.

A memory order guarantee method as another aspect of the present invention includes:

with a use of a shared memory, on receiving a Store instruction issued by a processor on a Release side which writes data, transmitting a request for invalidation of a cache to a processor on an Acquire side which reads data and also increasing a value of an execution counter, and transmitting a count value of the execution counter to the Release side processor asynchronously with the receiving of the Store instruction;

with a use of the Release side processor, issuing a Store Fence instruction to request for a guarantee of completion of invalidation of the cache of the Acquire side processor when a store counter and a wait counter have come to indicate 0, the Release side processor including the store counter and the wait counter, the store counter being configured to increase its value when the Store instruction is issued to the shared memory and, when a count value of the execution counter is received from the shared memory, decreasing its value by the count value of the execution counter, the wait counter being configured to, when the store counter has come to indicate 0, set a value indicating a predetermined time and decrease its value every unit time, the predetermined time being set so that a time from writing of a flag into the shared memory by the Release side processor after the predetermined time to reading of the flag by the Acquire side processor becomes larger than a time from transmission of the invalidation request by the shared memory to completion of the invalidation process on the cache in the Acquire side processor; and with a use of the Acquire side processor, after completion of the invalidation process on the cache on a basis of the invalidation request by the shared memory, issuing a Load Fence instruction to guarantee completion of invalidation of the cache in response to the Store Fence instruction.

A non-transitory computer-readable medium storing a computer program as another aspect of the present invention includes instructions for causing a computer to perform operations including:

with a use of a shared memory, on receiving a Store instruction issued by a processor on a Release side which writes data, transmitting a request for invalidation of a cache to a processor on an Acquire side which reads data and also increasing a value of an execution counter, and transmitting a count value of the execution counter to the Release side processor asynchronously with the receiving of the Store instruction;

with a use of the Release side processor, issuing a Store Fence instruction to request for a guarantee of completion of invalidation of the cache of the Acquire side processor when a store counter and a wait counter have come to indicate 0, the Release side processor including the store counter and the wait counter, the store counter being configured to increase its value when the Store instruction is issued to the shared memory and, when a count value of the execution counter is received from the shared memory, decreasing its value by the count value of the execution counter, the wait counter being configured to, when the store counter has come to indicate 0, set a value indicating a predetermined time and decrease its value every unit time, the predetermined time being set so that a time from writing of a flag into the shared memory by the Release side processor after the predetermined time to reading of the flag by the Acquire side processor becomes larger than a time from transmission of the invalidation request by the shared memory to completion of the invalidation process on the cache in the Acquire side processor; and with a use of the Acquire side processor, after completion of the invalidation process on the cache on a basis of the invalidation request by the shared memory, issuing a Load Fence instruction to guarantee completion of invalidation of the cache in response to the Store Fence instruction.

With the configurations described above, the present invention enables reduction of load on the network connecting the plurality of processors with the shared memory.

EXEMPLARY EMBODIMENT

Next, exemplary embodiments of the present invention will be described in detail with reference to the drawings.

First Exemplary Embodiment

First, a release consistency model on which the present invention is based will be described.

Figure 1:
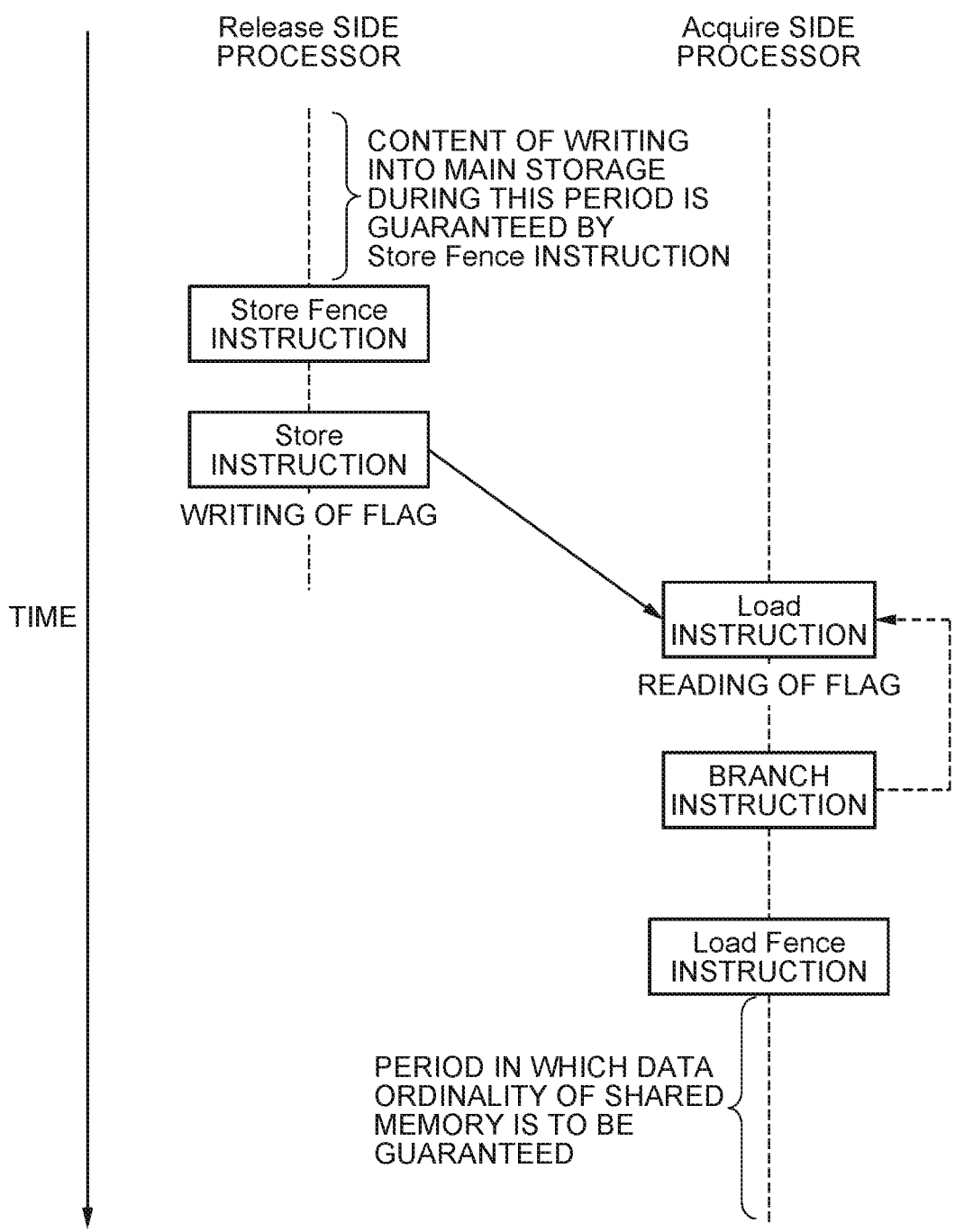
FIG. 1 is a diagram showing the mechanism of a memory order guarantee in a release consistency model.

FIG. 1 shows the mechanism of a memory order guarantee in the release consistency model. A memory order guarantee is to guarantee the global visibility of data. That is, it is to guarantee completion of a process which is necessary for realizing consistency between data held by a shared memory and data held by a cache. To be specific, in order to realize consistency between data held by a shared memory and data held by a cache, in response to a Store instruction to write data into the shared memory, an invalidation request for requesting invalidation of data of the cache. By detecting a timing of completion of processing of the issued invalidation request, global visibility is guaranteed. In the release consistency model, there is no restriction on the order of processing for the cache invalidation request. Accordingly, with respect to an invalidation request issued before a predetermined timing, a state where its processing has been completed may be referred to as "memory order guarantee" or "guarantee of data ordinality". In FIG. 1, a memory order guarantee is realized by a Store Fence instruction and a Load Fence instruction.

In FIG. 1, the present invention is applied to an information processing device which includes a shared memory and a plurality of processors each having a cache holding a copy of part of data stored in the shared memory. Moreover, FIG. 1 illustrates, considering one of the plurality of processors as a Release side processor and another as an Acquire side processor, a procedure for achieving synchronization between the Release side processor and the Acquire side processor by execution of a Store Fence instruction and writing of a flag based on a Store instruction (Write instruction) by the Release side processor and execution of a Load Fence instruction by the Acquire side processor.

A Store Fence instruction is an instruction for designating a timing at which the Release side processor and Acquire side processor synchronize with each other. In other words, a Store Fence instruction is an instruction for requesting to guarantee completion of a process to invalidate consistency between data held by the shared memory and data held by a cache included by the processor. Therefore, it can be said that, for the Acquire side processor, a timing of its detection of a Store Fence instruction is a timing of its being requested to guarantee completion of a process on data consistency.

In the release consistency model, the visualization order of memory access instructions issued before execution of the Store Fence instruction is not guaranteed. That is, because invalidation requests issued in association with memory access instructions (for example, Store instructions) are processed independently in terms of respective memory banks, the timing is undetermined. Therefore, at what timing a result of executing each of the memory access instructions can be referred to from other processors is not guaranteed. However, the Release side processor starts a process to guarantee completion of an access to the shared memory prior to the Store Fence instruction, taking as a trigger its execution of the Store Fence instructions for performing synchronization and its execution of the subsequent Store instruction.

To be specific, the Release side processor guarantees by the Store Fence instruction that an access instruction (in particular, a Store instruction) to the shared memory has been completed, and writes a predetermined flag into a predetermined area of the shared memory by the subsequent Store instruction. The Acquire side processor performs a sequence to wait (be in a wait state) by executing a Load instruction for reading the flag written through the Store instruction and a Branch instruction, and to advance to the next process when the wait is completed. It is assumed that, concerning the predetermined flag, there is an agreement determined in advance between the Release side processor and the Acquire side processor. The writing or reading area for the flag does not necessarily need to be in the shared memory, and may be in a register which is separately arranged for the synchronization.

When writing of the flag is detected through the Branch instruction, the Acquire side processor issues a Load Fence instruction. After the Load Fence instruction is issued, the Acquire side processor must guarantee the ordinality of data stored in the shared memory. That is, consistency between the shared memory and the cache memory needs to be guaranteed. Accordingly, in a time period after the issue of the Load Fence instruction (strictly, a time period after completion of processing the Load Fence instruction), it is required that processing of the invalidation request issued before the issue of the Store Fence instruction is completed and data ordinality of the shared memory is thus guaranteed.

In order to guarantee the data ordinality of the shared memory, the Store Fence instruction and the Load Fence instruction must realize the following three requirements.

(1) Through the Store Fence instruction, completion of a Store instruction prior to the Store Fence instruction is guaranteed.

(2) No Load instruction subsequent to the Load Fence instruction is speculatively executed. That is, an access to the shared memory before completion of the wait is prevented.

(3) At a time of completion of the Load Fence instruction, the Acquire side processor guarantees completion of an invalidation request to the Acquire side processor due to a Store instruction prior to the Store Fence instruction.

The function (2) can usually be realized within the processor by prohibiting a Load instruction from overtaking the Load Fence instruction, and therefore, it will not be described here.

As already described above, in the release consistency model, the order of completing invalidation requests must be guaranteed at the time of completion of the Load Fence instruction that is the synchronization process. That is, it is required that processing of all cache invalidation requests issued before the issue of the Store Fence instruction has been wholly completed at that time.

Accordingly, required is some sort of mechanism guaranteeing that all of invalidation requests due to Store instructions prior to the Store Fence instruction have been completed at the time of completion of the Load Fence instruction.

Problem to be Solved by this Exemplary Embodiment

Patent Document 1 describes a method for guaranteeing global visibility by providing each processor with two kinds of counters for synchronization (a store counter and a wait counter).

The store counter counts up by 1 when a Store instruction is issued to the shared memory, and counts down by 1 when an Ack is received from the shared memory. After the Store instruction is received, at a time when reflection of store data to the shared memory has become certain, that is, when it has been determined that no overtake by any subsequent instruction may occur, the shared memory returns an Ack to the processor having transmitted the Store instruction. When the value of the store counter is "0", it indicates that all Store instructions issued by the processor have already been completed.

When the value of the store counter has changed from "1" to "0", the wait counter is set to a predetermined value, and thereafter, until the value of the wait counter becomes "0", counts down by 1 every cycle. In a case where the value of the store counter has changed from "1" to "0" again before the value of the wait counter becomes "0", the wait counter is set to the predetermined one again. The value to be set to the wait counter will be described later.

In a case where the processor has detected a Store Fence instruction, it waits until both the store counter and the wait counter come to indicate "0", and prevents the issue of any subsequent Store instruction to the memory, whereby the Acquire side processor guarantees completion of an invalidation request before executing a Load Fence instruction.

Figure 2:
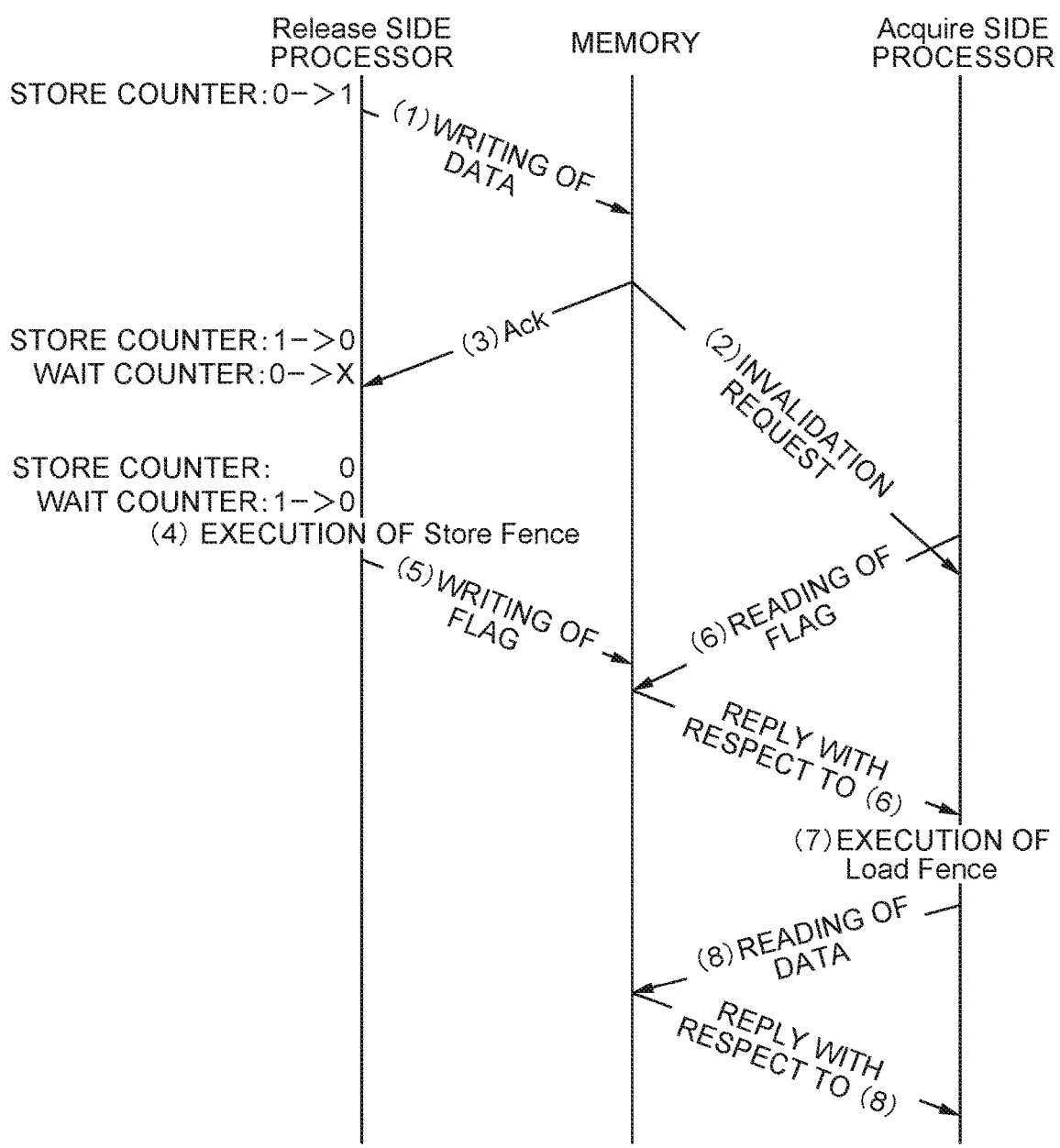
FIG. 2 is a time chart showing the operation of the Release side processor, the shared memory and the Acquire side processor of Patent Document 1 in a chronological order.

Hereinafter, with reference to a time chart of FIG. 2 showing the operation of the Release side processor, the shared memory and the Acquire side processor in a chronological order, a method for guaranteeing global visibility according to Patent Document 1 will be described.

(1) The Release side processor issues a Store instruction to the shared memory. Then, the Release side processor causes its store counter to count up by 1.
(2) At a time when reflection of the store data to the shared memory has become certain, the shared memory transmits an invalidation request to an Acquire side processor holding data of the same address as that of the Store instruction.
(3) At the same time as (2), the shared memory transmits an Ack to the transmitter of the Store instruction. On receiving the Ack, the Release side processor causes its store counter to count down by 1. Moreover, in a case where the value of the store counter has become "0", the Release side processor sets its wait counter to a value "X". After that, the Release side processor causes the wait counter to count down by 1 every cycle.
(4) On detecting a Store Fence instruction, the Release side processor waits until both the value of the store counter and the value of the wait counter come to indicate "0".
(5) When both the value of the store counter and the value of the wait counter have become "0", the Release side processor writes a flag through a subsequent Store instruction.
(6) The Acquire side processor reads the flag written in (5).
(7) The Acquire side processor executes a Load Fence instruction.
(8) Through a Load instruction, the Acquire side processor reads the store data written through the Store instruction in (1) by the Release side processor.

Transmission of an invalidation request by the shared memory in (2) and an invalidation process performed by the Acquire side processor having received the invalidation request must be prior to execution of a Load Fence instruction in (7). If they are performed later than the Load Fence instruction, reading of the data in (8) is performed not from the shared memory but from the cache memory inside the Acquire side processor. As a result, the data ordinality cannot be guaranteed.

Therefore, the value X set to the wait counter when the value of the store counter has changed from "1" to "0" is determined to be a value X which always satisfies the following expression.
(a time from transmission of an invalidation request by the shared memory in (2) to completion of invalidation of the cache in the Acquire side processor)<(a time taken for transmission of an Ack by the shared memory in (3), writing of a flag by the Release side processor in (5) and reading the flag by the Acquire side processor in (6))+X It is expressed as the following equation (1)

$$X = \text{(the maximum of a time taken for the invalidation process)} - \text{(the minimum of a time taken totally by (3),(5) and (6))} \quad \text{equation (1)}$$

Figure 3:
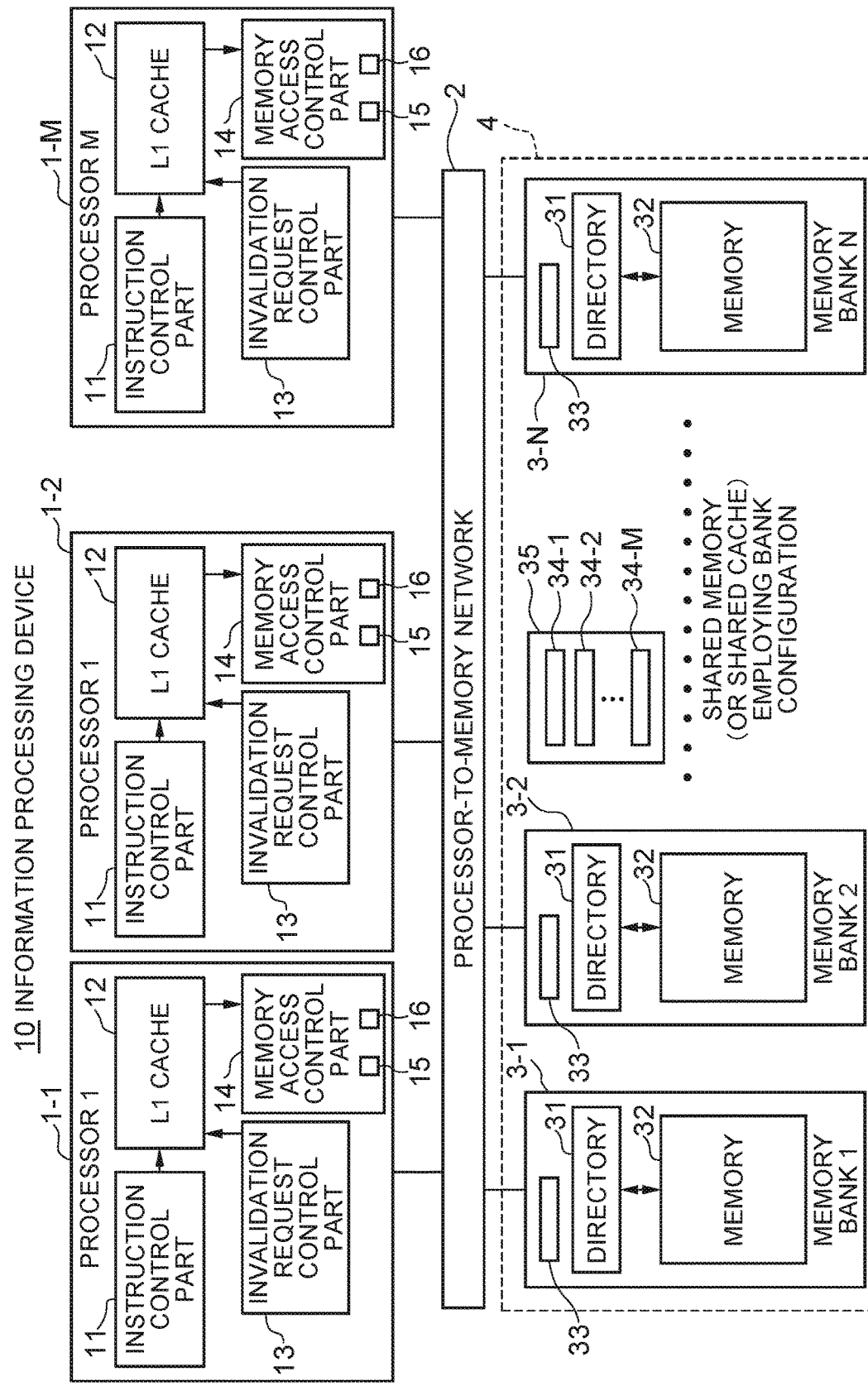
FIG. 3 is a block diagram of an information processing device according to a first exemplary embodiment of the present invention.

Thus, in Patent Document 1, the shared memory having received a Store instruction from the Release side processor transmits an invalidation request to the Acquire side processor in (2) of the time chart of FIG. 2 and simultaneously sends an Ack to the processor of the sender of the Store instruction in (3). That is, one Ack is returned for every execution of one Store instruction. As a result, load on the network connecting the plurality of processors with the shared memory is heavy. Moreover, in the case of using a line exclusive for transmission of an Ack, there is need to connect, in a configuration including a plurality of processors and a plurality of memory banks as shown in FIG. 3, all the processors to all the memory banks and use many signal lines, which causes increase of hardware volume.

Summary of this Exemplary Embodiment

In this exemplary embodiment, execution counters each counting the number of executed Store instructions are included by the shared memory. The execution counters are associated with the processors one to one. In Patent Document 1, after receiving a Store instruction, at a time when reflection of the store data to the memory has become certain, that is, when it has been determined that no overtake by any subsequent instruction may occur, the shared memory returns an Ack to the processor having sent the Store instruction. On the other hand, in this exemplary embodiment, the shared memory does not return an Ack but causes the execution counter corresponding to the processor having transmitted the Store instruction to count up. Then, asynchronously with the receiving of the Store instruction, the shared memory notifies the content of the execution counter, that is, the number of completed Store instructions to the transmitter processor. This notification uses a signal line used in reply from the shared memory to the processor. The timing of the notification is (A) when there is a reply from the shared memory to the processor and an unused signal line is present, or (B) when load on the network connecting the processor with the shared memory is small.

On receiving the content of the execution counter, the processor decreases the value of the store counter by the number indicated by the execution counter. In a case where the value of the store counter is "0", it represents completion of all Store instructions issued by the processor. The other operation is basically the same as in Patent Document 1.

Configuration of this Exemplary Embodiment

With reference to FIG. 3, an information processing device 10 according to this exemplary embodiment includes a plurality of processors 1 (1-1 to 1-M), a shared memory 4, and a processor-to-memory network 2 connecting the plurality of processors 1 with the shared memory 4. The shared memory 4 may be a shared cache. The shared cache also includes an on-chip cache shared by recent multicore processors.

Each of the processors 1 includes an instruction control part 11, an L1 cache 12, an invalidation request control part 13, and a memory access control part 14.

The instruction control part 11 executes control of instructions. The instruction control part 11 has a function to prevent speculative execution of a Load instruction subsequent to a Load Fence instruction.

The L1 cache 12 is a level-1 cache arranged for each processor or each processor core in general.

In a case where, when a Store instruction is issued by another one of the processors 1 to the shared memory 4, the processor 1 holds the same cache line, a request for invalidation of the cache line is issued by the shared memory 4.

The invalidation request control part 13 of the processor 1 has a function to invalidate the L1 cache 12 in response to the invalidation request.

The memory access control part 14 has a function to control the issue of a memory access instruction to the shared memory 4 by the processor 1. The memory access control part 14 has a store counter 15 and a wait counter 16. The memory access control part 14 has a function to, on detecting a Store Fence instruction, prevent execution of a subsequent Store instruction until the values of the two counters, namely, the store counter 15 and the wait counter 16 become "0".

The processor-to-memory network 2 is a mechanism for connecting the plurality of processors 1 with the shared memory 4, where no restriction is placed on the connection form.

The shared memory 4 includes a plurality of memory banks 3 (3-1 to 3-N), and a storage part 35 for storing a plurality of execution counters 34 (34-1 to 34-M). The execution counters 34 are associated with the processors 1 one to one. The memory banks 3 are bank-type memories configuring the shared memory 4. Each of the memory banks (3-1 to 3-N) includes a directory 31, a memory 32, and a memory control part 33.

The directory 31 holds memory management information which is necessary to perform centralized control of consistency between the L1 cache 12 and the shared memory 4. For example, the shared memory is divided into predetermined management units and, in the directory 31, the state of its management unit and information of the processor 1 whose L1 cache 12 holds a copy of the management unit are recorded. The memory control part 33 has a function to accept a request from the processor-to-memory network 2, access the directory 31, and perform centralized control of consistency between the L1 cache 12 and the shared memory 4. The memory control part 33 also has a function to issue an invalidation request to the processor 1 having the L1 cache 12 that needs to be invalidated in a case where invalidation of the L1 cache 12 is determined to be necessary. The memory control part 33 performs a process to read and write data from and into the memory 32. The memory control part 33 also has a function to control the operation of the execution counter 34. The memory 32 is a general memory used in a computer system.

Herein, the instruction control part 11, the invalidation request control part 13 and the memory access control part 14 are configured by, for example, a hardware circuit such as a logic circuit. The shared memory 4 (each memory bank 3) and the execution counter 34 are configured by, for example, a storage device such as a disk device and a semiconductor memory. The information processing device 10 may be realized by a computer device. In this case, the instruction control part 11, the invalidation request control part 13 and the memory access control part 14 may be realized by execution of a program stored in a memory, not illustrated in the diagram, by a processor of the information processing device 10 that is a computer. The program may be stored in a nonvolatile memory.

Figure 13:
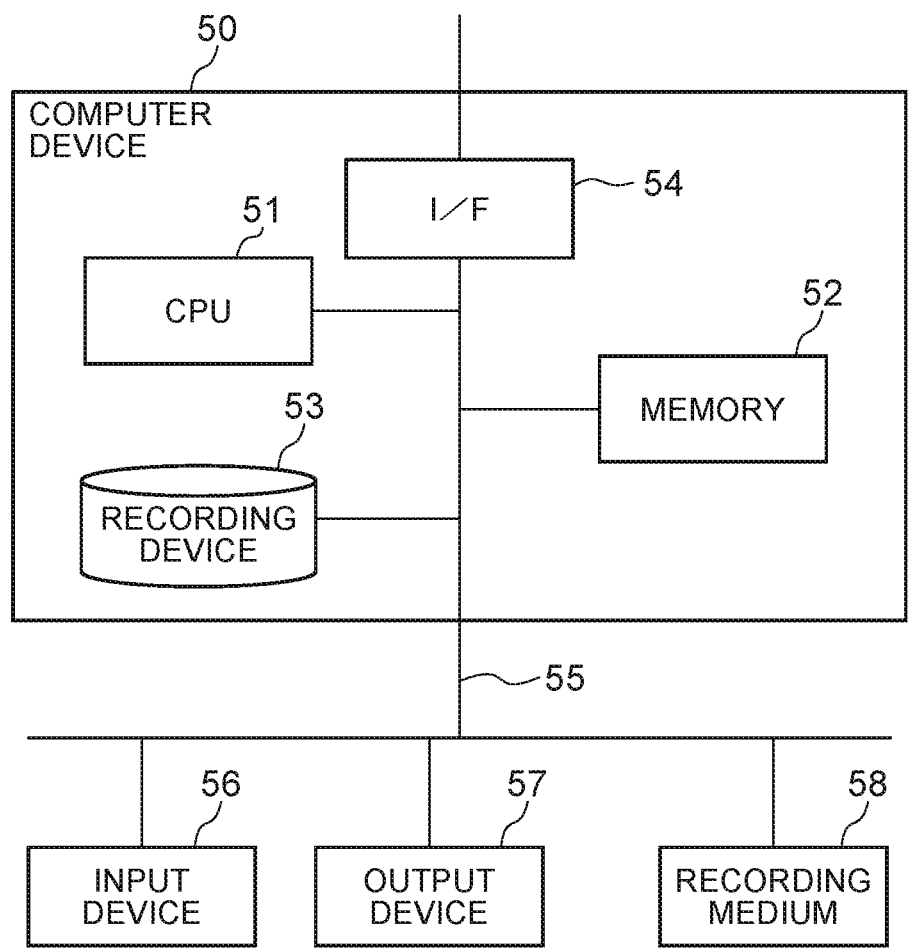
FIG. 13 is a block diagram showing a hardware circuit realizing the information processing device of the present invention with a computer device.

FIG. 13 is a block diagram showing a hardware circuit realizing the information processing device 10 with a computer device 50. As shown in FIG. 13, the computer device 50 includes a CPU (Central Processor Unit) 51, a memory 52, a storage device 53 for storing a program, such as a hard disk, and an I/F (Interface) 54 for network connection. The computer device 50 is connected to an input device 56 and an output device 57 via a bus 55.

The CPU 51 runs an operating system and thereby controls the whole computer device 50. The CPU 51 may, for example, read a program and data from a recording medium 58 mounted in a drive device and store them into the memory 52. The CPU 51 functions as part of the instruction control part 11, the invalidation request control part 13 and the memory access control part 14 in the information processing device 10 shown in FIG. 3, and executes various processes according to the program. The CPU 51 may consist of a plurality of CPUs. The plurality of CPUs may be the processors 1-1 to 1-M.

The storage device 53 is, for example, an optical disk, a flexible disk, a magneto-optical disk, an external hard disk, a semiconductor memory, or the like. The recording medium 58 is a nonvolatile storage device, in which a program to be executed by the CPU 51 is recorded. The recording medium 58 may be part of the storage device 53. The program may be downloaded via the I/F 54 from an external computer, not illustrated in the diagram, which is connected to the communication network. The storage device 53 and the memory 52 may be ones configuring the shared memory 4.

The input device 56 is realized by, for example, a mouse, a keyboard, built-in key buttons or the like, and is used for an input operation. The input device 56 is not limited to a mouse, a keyboard or built-in buttons, but may be a touch panel, for example. The output device 57 is realized by, for example, a display screen and is used for checking the output.

As described above, the computer device 50 corresponding to the information processing device 10 shown in FIG. 3 is realized by the hardware configuration shown in FIG. 13. However, the configuration of the computer device 50 is not limited to that of FIG. 13. For example, the input device 56 and the output device 57 may be ones installed outside via the interface 54.

Further, the computer device 50 may be realized by a physically integrated single device or by physically separated two or more devices which are connected with each other by wire or wireless.

Operation of this Exemplary Embodiment

Figure 4:
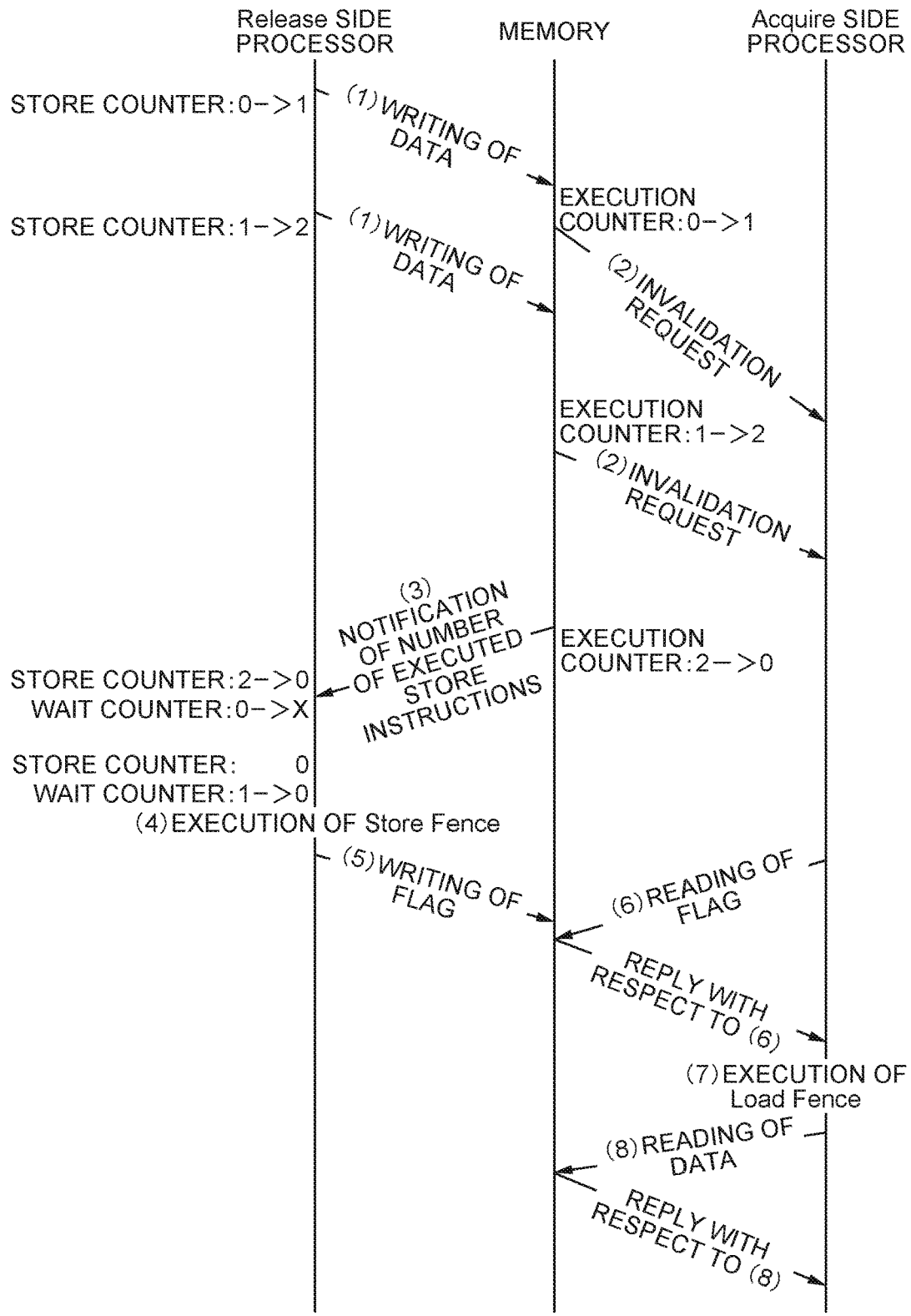
FIG. 4 is a time chart showing the operation of a Release side processor, a shared memory and an Acquired side processor of the information processing device according to the first exemplary embodiment of the present invention in a chronological order.

Hereinafter, with reference to a time chart of FIG. 4 showing the operation of the Release side processor 1, the shared memory 4 and the Acquire side processor 1 in chronological order, a method for guaranteeing global visibility according to this exemplary embodiment will be described. In FIG. 4, the operation is the same as that of FIG. 2 except (3).

(1) The Release side processor issues a Store instruction to the shared memory. Then, the Release side processor causes its store counter to count up by 1.

(2) At a time when reflection of the stored data to the memory has become certain, the shared memory causes the execution counter associated with the processor having issued the Store instruction to count up by 1. At the same time, the shared memory transmits an invalidation request to the Acquire side processor holding data of the same address as that of the Store instruction.

(3) The shared memory transmits the value of the execution counter to the transmitter of the Store instruction (A) when there is a reply from the shared memory to the processor and an unused signal line is present or (B) when load on the processor-to-shared memory network is small. On receiving the value of the execution counter, the Release side processor decreases the store counter by the value of the execution counter. When the store counter has become "0", the Release side processor sets "X" at the wait counter. After that, the Release side processor causes the wait counter to count down by 1 at every one cycle.

The value X set at the wait counter is a value by replacing the minimum of a time necessary for (3) on the right side in the equation (1) with the minimum of a time which is necessary for the shared memory to transmit the value of the execution counter.

(4) On detecting a Store Fence instruction, the Release side processor waits until both its store counter and its wait counter come to indicate "0".
(5) When both the value of the store counter and the value of the wait counter has become "0", the Release side processor writes a flag when issuing a subsequent Store instruction.
(6) The Acquire side processor reads the flag written in (5).
(7) The Acquire side processor executes a Load Fence instruction.
(8) By a Load instruction, the Acquire side processor reads the store data written by the Release side processor with the use of the Store instruction in (1).

Next, the operation of the information processing device 10 according to this exemplary embodiment will be described in more detail with the use of flowcharts shown in FIGS. 5, 6 and 7.

Figure 5:
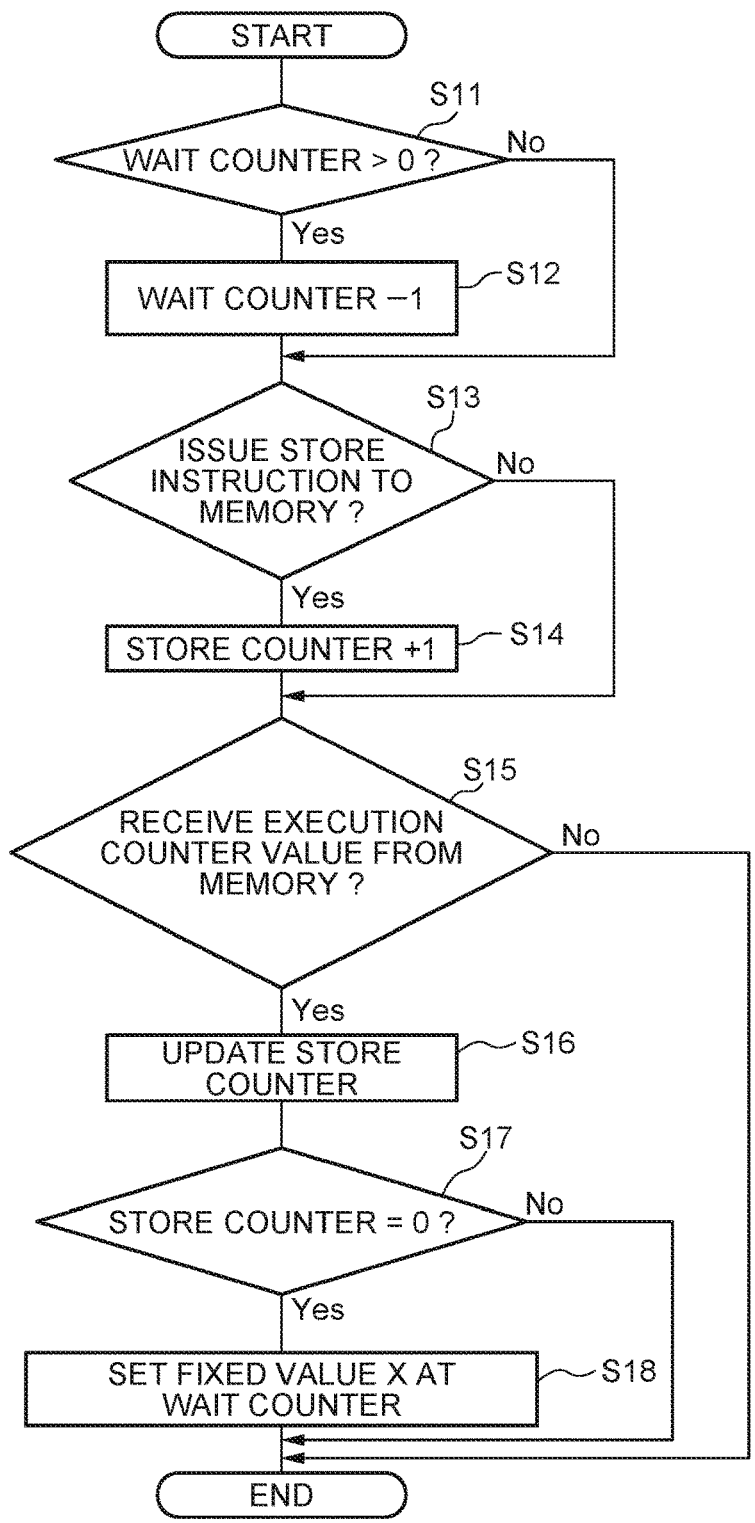
FIG. 5 is a flowchart showing the operation of a store counter and a wait counter in a memory access control part of the Release side processor of the information processing device according to the first exemplary embodiment of the present invention.

FIG. 5 is a flowchart showing the operation of the store counter 15 and the wait counter 16 in the memory access control part 14 of the Release side processor. Here, the operation of the Acquire side processor is only prevention of a speculative Load instruction subsequent to the Load Fence instruction by the instruction control part 11. Because such an operation is a conventional process, its description using a flowchart will not be given here.

With reference to FIG. 5, the memory access control part 14, in a case where its wait counter 16 indicates a value larger than 0 (step S11), causes the wait counter to count down by "1" (step S12). Next, in a case where a Store instruction has been issued to the shared memory 4 (step S13), the memory access control part 14 causes the store counter 15 to count up by 1 (step S14). Next, in a case where the value of the execution counter 34 from the shared memory 4 is received (step S15), the memory access control part 14 updates by decreasing the value of the execution counter 34 from the store counter 15 (step S16). Further, when the value of the store counter 15 has become "0" (step S17), the memory access control part 14 sets a fixed number X at the wait counter 16 (step S18). The above operation is executed once a cycle. Accordingly, the wait counter 16 counts by 1 at each one cycle.

Figure 6:
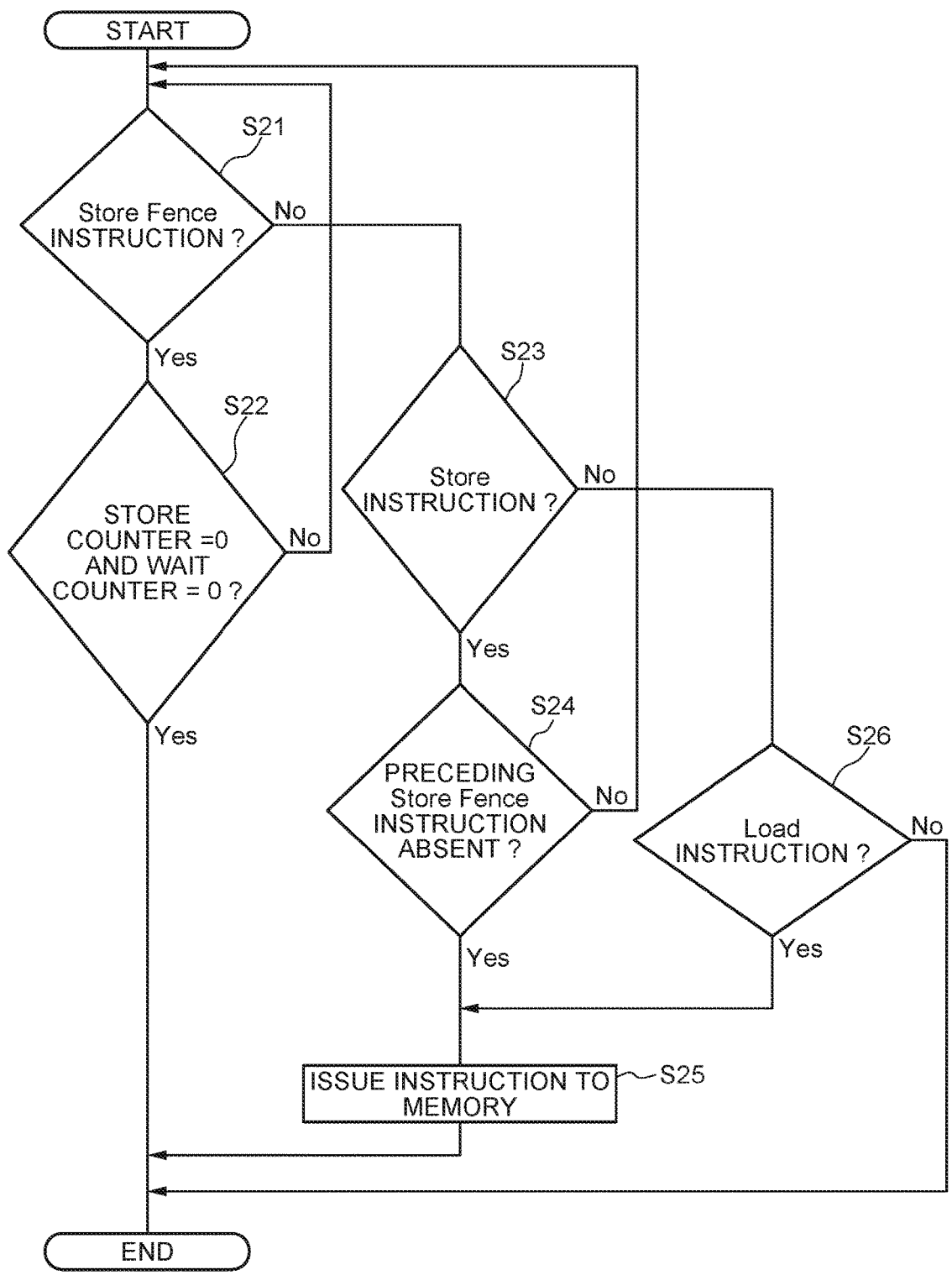
FIG. 6 is a flowchart showing instruction processing operation in the information processing device according to the first exemplary embodiment of the present invention.

FIG. 6 is a flowchart showing instruction processing operation in the information processing device 10. With reference to FIG. 6, in a case where an instruction detected by the memory access control part 14 is a Store Fence instruction (step S21) and both the store counter 15 and the wait counter 16 indicate "0" (step S22), Store Fence instruction processing in the information processing device 10 ends. However, in a case where either the store counter 15 or the wait counter 16 indicates a value larger than "0" (NO at step S22), the memory access control part 14 returns to the step S21 and performs the same process in the next cycle. After that, until both the store counter 15 and the wait counter 16 come to indicate "0" and the processing of the Store Fence instruction accordingly ends, the memory access control part 14 repeats the same operation.

On the other hand, in a case where an instruction detected by the memory access control part 14 is a Store instruction (step S23) and in a case where there is no Store Fence instruction having not been processed yet by the memory access control part 14 (YES at step S24), the memory access control part 14 issues a Store instruction to the processor-to-memory network 2 (step S25), by which Store instruction processing ends. However, in a case where there is any Store Fence instruction having not been processed by the memory access control part 14 (NO at step S24), the memory access control part 14 returns to the step S21. After that, until both the store counter 15 and the wait counter 16 come to indicate 0 and the processing of the Store Fence instruction accordingly ends, the memory access control part 14 repeats the same operation.

Further, in a case where an instruction detected by the memory access control part 14 is a Load instruction (YES at step S26), the memory access control part 14 issues the Load instruction to the processor-to-memory network 2 (step S25). By that, Load instruction processing ends. Further, in a case where no Load instruction is detected in the step S26, the memory access control part 14 presents that there is no detected instruction and ends the process.

Figure 7:
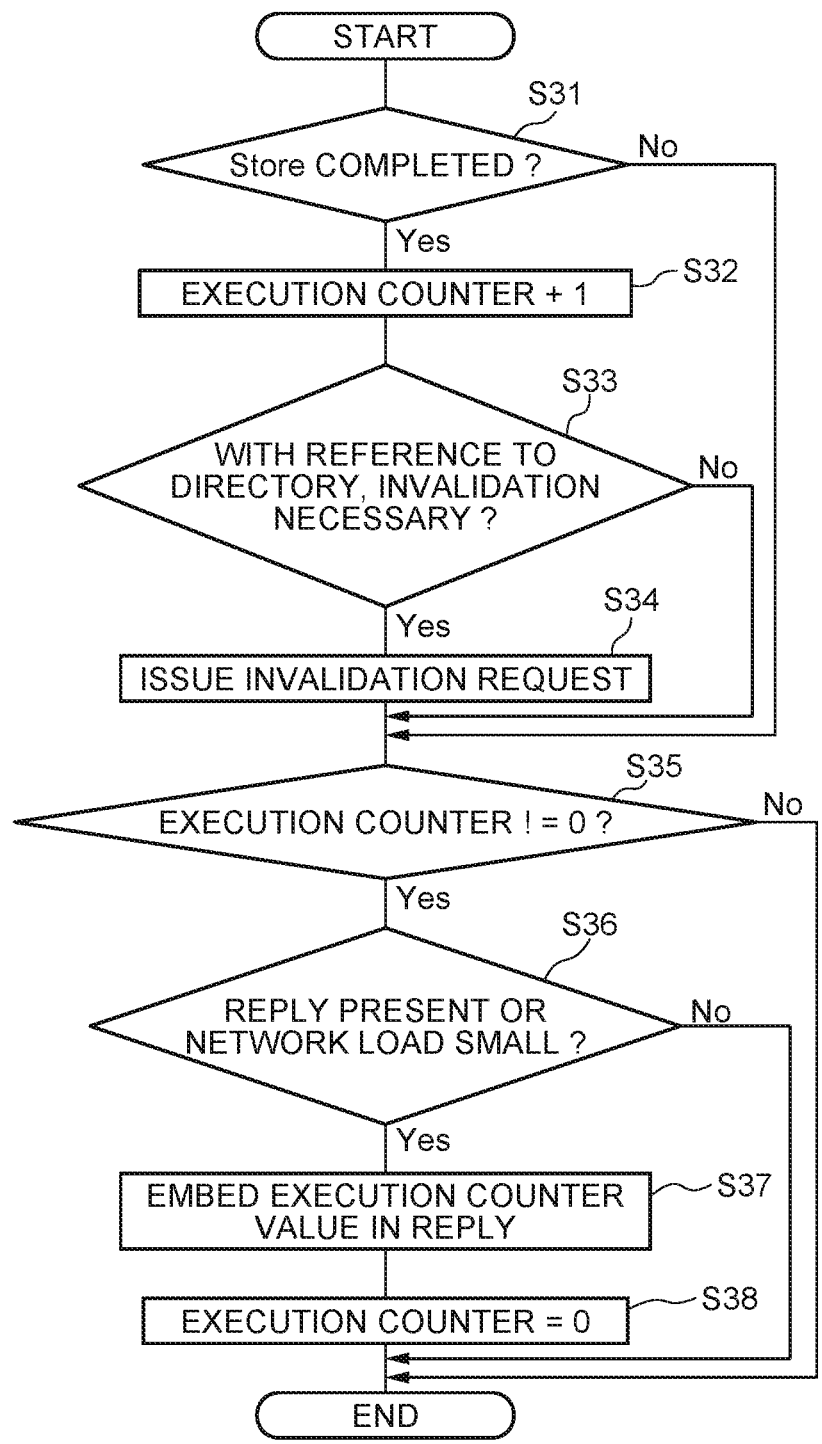
FIG. 7 is a flowchart showing the operation of a memory control part relating to a Store instruction execution counter in the shared memory of the information processing device according to the first exemplary embodiment of the present invention.

FIG. 7 is a flowchart showing the operation of the memory control part 33 relating to the Store instruction execution counter 34 in the shared memory 4. The Store instruction execution counter 34 is given for each processor 1. The operation shown in FIG. 7 represents operation relating to an execution counter 34 associated with a certain single processor 1. The operation shown in FIG. 7 is performed in the same manner by an execution counter 34 associated with another processor 1.

With reference to FIG. 7, the memory control part 33 of the shared memory 4, at a time when execution of a Store instruction issued by a certain processor is completed in the memory 32 (YES at step S31), causes an execution counter associated with the processor to count up by 1 (step S32). Herein, the time when execution of a Store instruction is completed in the memory 32 is a time when reflection of the store data to the memory 32 has become certain, that is, a time when it has been determined that no overtake by any subsequent instruction may occur. Next, the memory control part 33 refers to the directory 31 and determines whether invalidation of the L1 cache 12 of the associated processor 1 is necessary (step S33). The memory control part 33 determines that an L1 cache 12 holding data with the same address as the Store instruction needs to be invalidated. In a case where it is determined that the L1 cache 12 needs to be invalidated, the memory control part 33 transmits a request for invalidation of the data with the address to the processor 1 including the L1 cache 12 that needs to be invalidated (step S34).

Further, in a case where the value of the execution counter 34 is equal to 0 (NO at step S35), the memory control part 33 finishes the process. On the other hand, in a case where the value of the execution counter 34 is unequal to 0 (1 or more) (YES at step S35), the memory control part 33 determines whether there is a reply to be returned to the processor 1 and also there is an unused signal line or load on the processor-to-memory network 2 is small (step S36).

In a case where there is not a reply or in a case where there is a reply but there is no unused line and load on the network is small (NO at step S36), the memory control part 33 finishes the process of FIG. 7. However, in a case where there is a reply and there is an unused line or in a case where load on the network is small, the memory control part 33 embeds the value of the execution counter into the reply and transmits to the processor 1 through the processor-to-memory network 2 (step S37). At this time, the memory control part 33 sets the value of the execution counter 35 to 0 (step S38), and the process ends. The operation described above is executed once a cycle.

The steps S36 and S37 will be described in more detail below. The memory control part 33 transmits the value of the execution counter from the shared memory 4 to the processor 1 with the use of a signal line used in replay of signal lines configuring the processor-to-memory network 2.

In general, there are a plurality of signal lines used in replay so that parallel transmission is performed. In a case where the bit number of a reply to be transmitted is less than the number of signal lines used in replay, some of the signal lines are unused. In a case where the number of the unused signal lines is equal to or more than the bit number of the execution counter, it is possible to transmit the value of the execution counter from the shared memory 4 to the processor 1 with the use of the unused signal lines. The determination whether there is a reply to be returned to the processor 1 and an unused signal line is present at step S36 is performed by the memory control part 33 on the basis of the abovementioned point of view. For example, the memory control part 33 refers to a buffer which temporarily accumulates replies to be transmitted and thereby determines whether there is a reply to be returned to the processor 1 associated with the execution counter 34. Moreover, for example, the memory control part 33 compares the number of signal lines used in transmission of the reply with the data size and thereby determines whether there is an unused signal line. However, the method for determining whether the reply is present and there is an unused signal line is not limited to the determination method described above, and may be any determination method. In this case, embedding of the value of the execution counter into the reply at step S37 means transmitting of the value of the execution counter together with the reply from the shared memory 4 to the processor 1 with the use of the unused signal line (hereinafter, this transmission mode will be referred to as a first transmission mode).

On the other hand, the memory control part 33 performs the determination whether the network load is small or not at step S36, on the basis of load on a network of signal lines used in replay of the signal lines configuring the processor-to-memory network 2. For example, the shared memory 4 measures a traffic in a network of signal lines used in reply and, in a case where the latest traffic per unit time is less than a threshold, determines that the network load is small. However, the network load determination method is not limited to the method described above, and may be any determination method. In this case, embedding of the value of the execution counter into the reply at step S37 means transmitting of the value of the execution counter separately from the reply from the shared memory 4 to the processor 1 with the use of the signal line used in replay (hereinafter, this transmission mode will be referred to as a second transmission mode).

In a case where, at step S36, a reply to be returned to the processor 1 is present and there is an unused signal line, and load on the processor-to-memory network 2 is small, the memory control part 33 uses the first transmission mode more preferentially than the second transmission mode. However, the shared memory 4 may use the second sending mode more preferentially than the first sending mode.

Effect of this Exemplary Embodiment

According to this exemplary embodiment, it is possible to reduce load on a network connecting a plurality of processors with a shared memory, and also guarantee the global visibility of an invalidation request to an Acquire side processor when performing memory order guarantee based on the release consistency model. This is because the shared memory has an execution counter which counts the number of completed Store instructions and, on receiving a Store instruction issued by a Release side processor which writes data, transmits a cache invalidation request to an invalidation request control part of the Acquire side processor that reads data, and also increases the execution counter and transmits a count value of the execution counter to the Release side processor asynchronously with the receiving of the Store instruction. By thus transmitting the value of the execution counter to the processor at a time unrelated to the receiving of the Store instruction, an event that one execution counter value is transmitted every time one Store instruction is received does not always occur. In a case where Store instructions are frequently issued, an event that one execution counter value of 2 or more is transmitted with respect to a plurality of Store instructions can occur. Consequently, load on the network is reduced.

Further, according to this exemplary embodiment, the value of the execution counter is notified (A) when there is a reply from the shared memory to the processor and an unused signal line is present, or (B) when load on the processor-to-memory network is small. Therefore, it is possible to further reduce load on the network.

Further, according to this exemplary embodiment, the value of the execution counter is transmitted from the shared memory to the processor with the use of a signal line used in reply. Therefore, it is possible to prevent increase of a hardware volume.

Second Exemplary Embodiment

In the first exemplary embodiment, the value of the execution counter is notified by the shared memory to the processor (A) when there is a reply from the shared memory to the processor and an unused signal line is present or (B) when load on the processor-to-memory network is small. However, in a case where there is no reply from the shared memory to the processor and load on the network is heavy, notification of the value of the execution counter may delay. This exemplary embodiment solves such a problem.

In this exemplary embodiment, the memory access control part 14 has a function to, on detecting a Store Fence instruction, issue a Store Fence detection notification to the processor-to-memory network 2. The memory control part 33 of the shared memory 4 has a function to, on receiving the Store Fence detection notification, notify the value of the execution counter 34 associated with the processor having issued the Store Fence detection notification to the processor having issued the Store Fence detection notification.

Figure 8:
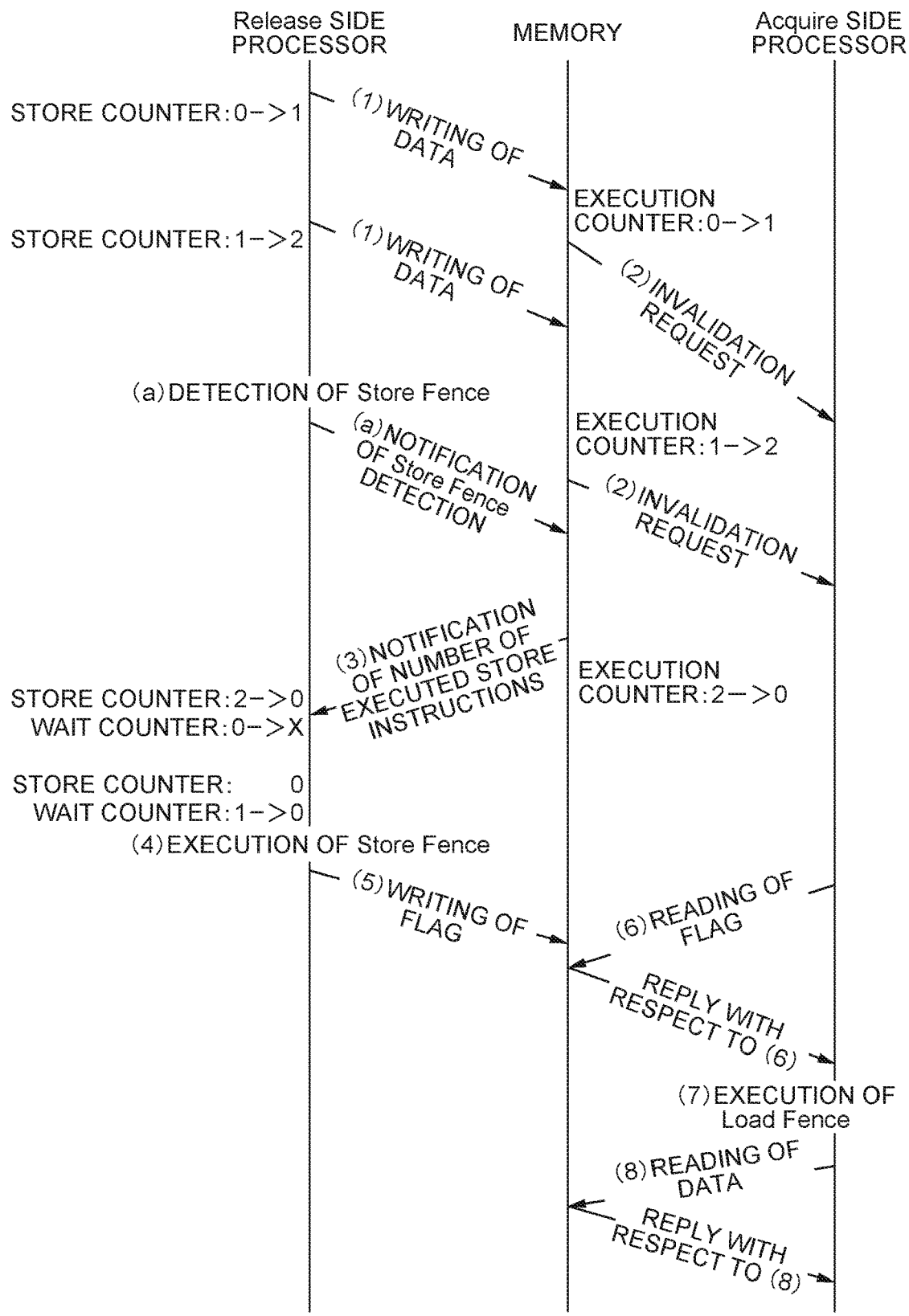
FIG. 8 is a time chart showing the operation of the Release side processor, the shared memory and the Acquire side processor of the information processing device according to the first exemplary embodiment of the present invention in a chronological order.

FIG. 8 is a time chart showing the operation of the Release side processor, the shared memory and the Acquire side processor of this exemplary embodiment in chronological order. FIG. 8 is the same as FIG. 4 except that, in FIG. 8, the Release side processor additionally performs (a) Store Fence detection and (a) notification of Store Fence detection.

Figure 9:
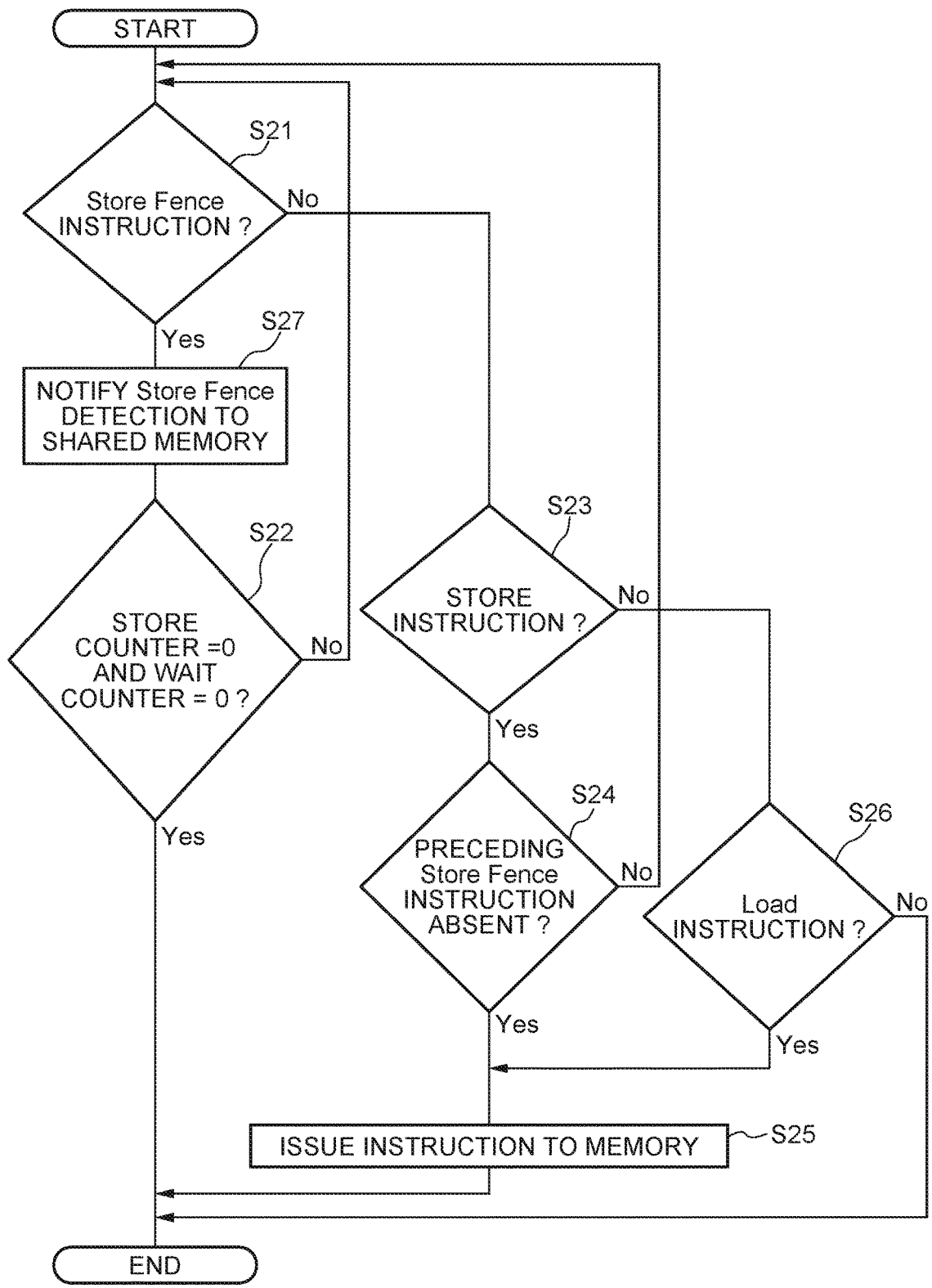
FIG. 9 is a flowchart showing instruction processing operation in an information processing device according to a second exemplary embodiment of the present invention.

FIG. 9 is a flowchart showing instruction processing operation in the Release side processor in this exemplary embodiment. FIG. 9 is the same as FIG. 6 except that, in FIG. 9, step S27 is added in which, on detecting a Store Fence instruction (step S21), the memory access control part 14 issues a Store Fence detection notification to the shared memory. Only one Store Fence detection notification is issued with respect to one Store Fence instruction.

Figure 10:
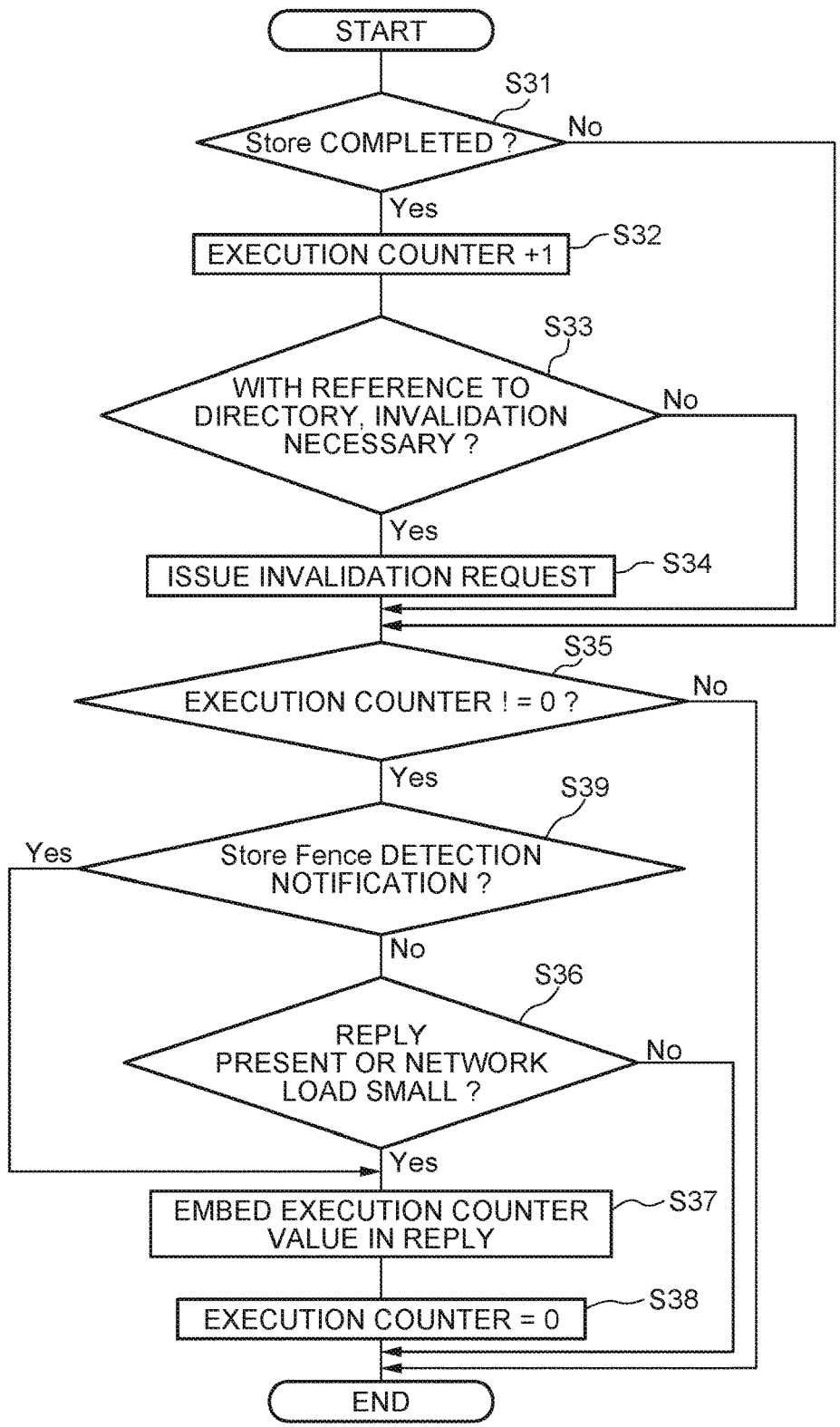
FIG. 10 is a flowchart showing the operation of a memory control part relating to a Store instruction execution counter in a shared memory of the information processing device according to the second exemplary embodiment of the present invention.

FIG. 10 is a flowchart showing the operation of the memory control part 33 relating to the Store instruction execution counter 34 in the shared memory 4 in this exemplary embodiment. With reference to FIG. 10, in a case where the value of the execution counter is unequal to 0 (YES at step S35), when a Store Fence detection notification has not been received (NO at step S39), the memory control part 33 of the shared memory 4 advances to step S36, whereas when a Store Fence detection notification has been received (YES at step S39), the memory control part 33 skips Step S36 and advances to Step S37. FIG. 10 is the same as FIG. 7 except the abovementioned point.

Thus, according to this exemplary embodiment, on detecting a Store Fence instruction, the memory access control part 14 of the processor 1 issues a Store Fence detection notification to the processor-to-memory network 2 and, on receiving the Store Fence detection notification, the memory control part 33 of the shared memory 4 notifies the value of the execution counter 34 to the processor. Accordingly, it is possible to notify the value of the execution counter to the processor that needs to refer to the value of the execution counter 34.

Third Exemplary Embodiment

In this exemplary embodiment, the memory control part 33 of the shared memory 4 has a function to notify, in a case where a request from the Release side processor 1 is absent for a predetermined time, the value of the execution counter 34 associated with the processor to the Release side processor.

Figure 11:
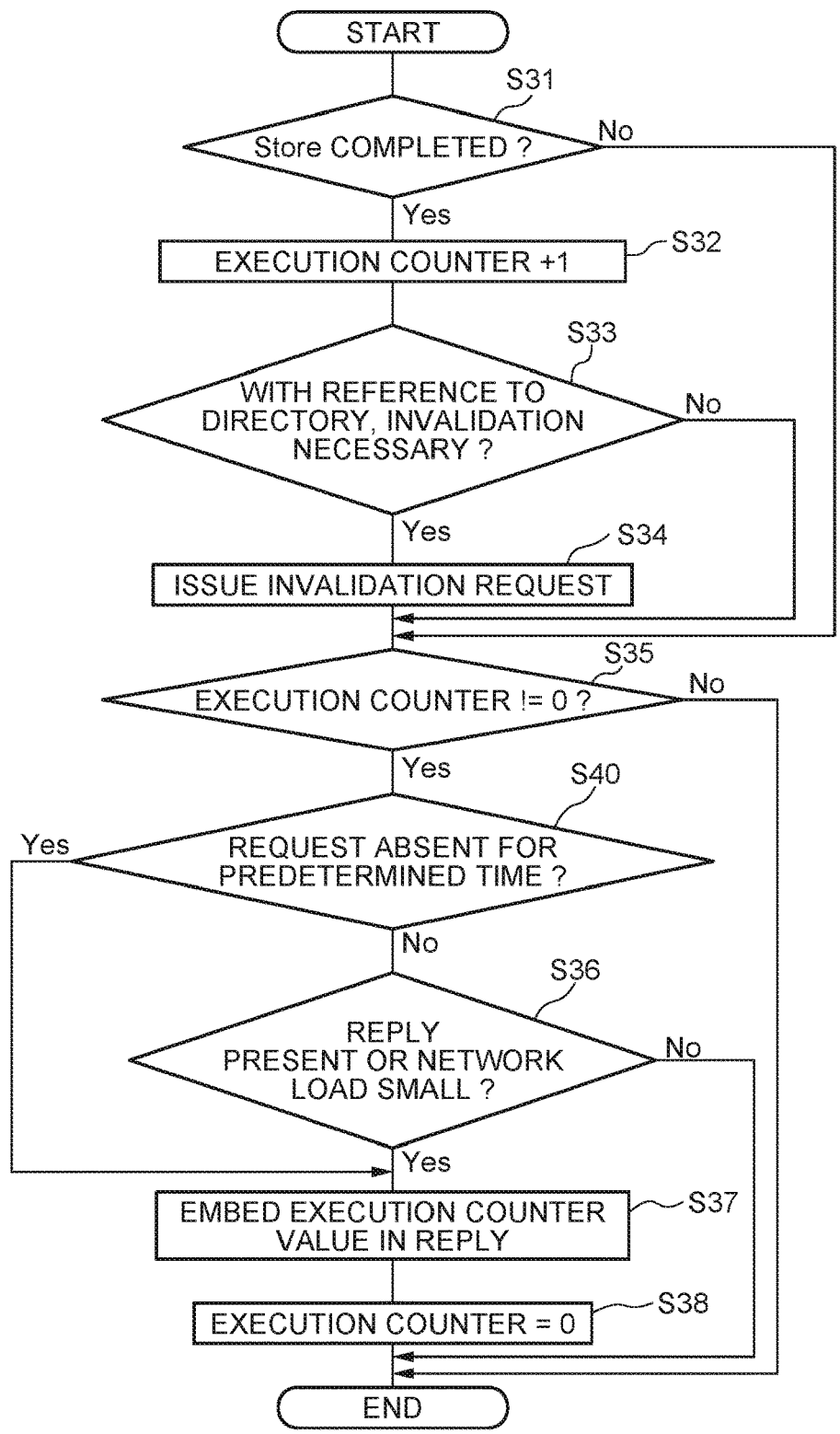
FIG. 11 is a flowchart showing the operation of a memory control part relating to a Store instruction execution counter in a shared memory of an information processing device according to a third exemplary embodiment of the present invention.

FIG. 11 is a flowchart showing the operation of the memory control part 33 relating to the Store instruction execution counter 34 in the shared memory 4 of this exemplary embodiment. With reference to FIG. 11, in a case where the value of the execution counter is unequal to 0 (YES at step S35) and a request from the processor is present within a predetermined time (NO at step S40), the memory control part 33 of the shared memory 4 advances to step S36, whereas in a case where a request is absent within the predetermined time (YES at step S40), the memory control part 33 skips Step S36 and advances to Step S37. FIG. 11 is the same as FIG. 7 except the abovementioned point.

Thus, according to this exemplary embodiment, in a case where there is no request from the processor 1 for a predetermined time, the memory control part 33 of the shared memory 4 notifies the value of the execution counter associated with the processor to the processor. Therefore, it is possible to prevent delay of notification of the value of the execution counter from the shared memory to the processor.

Fourth Exemplary Embodiment

Figure 12:
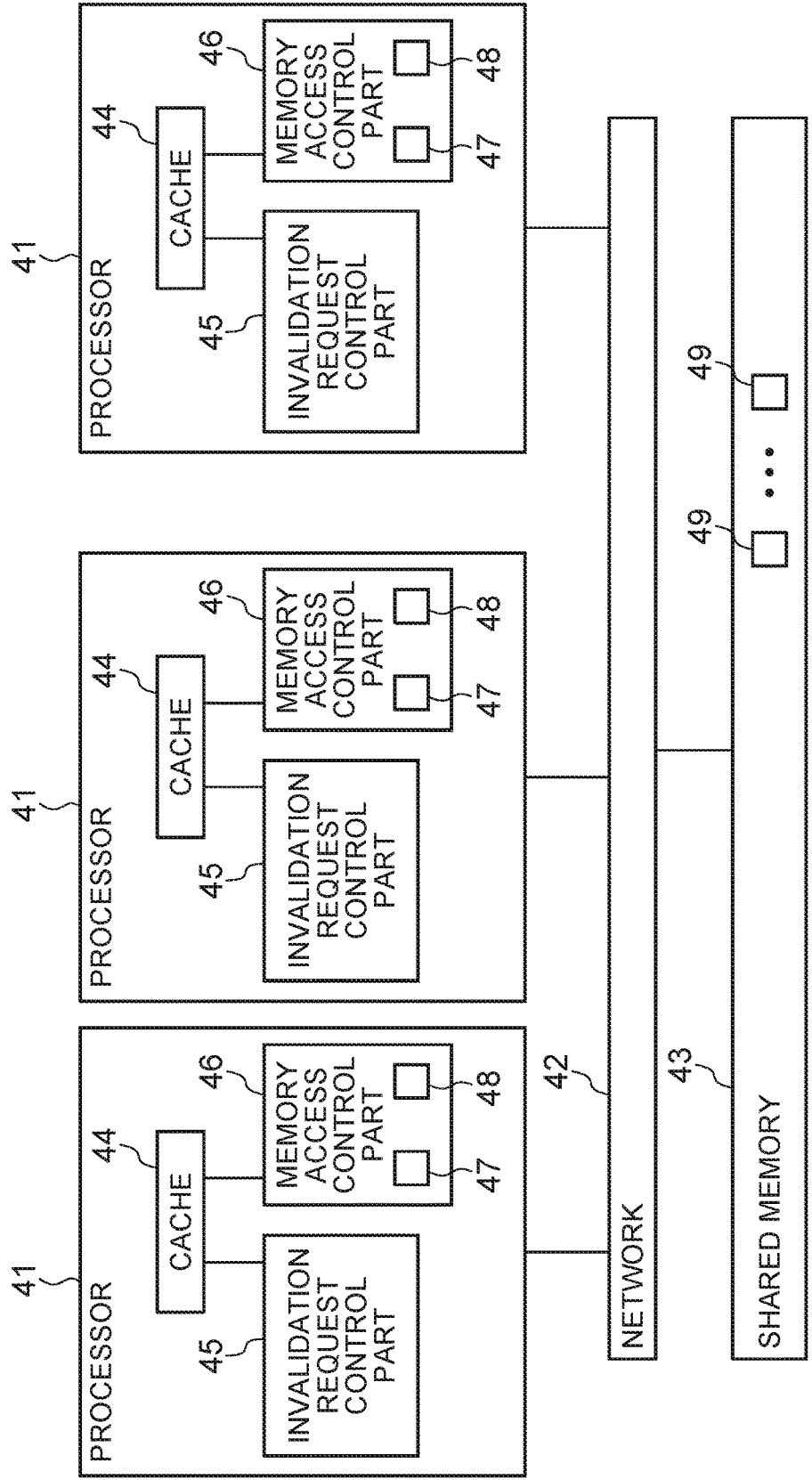
FIG. 12 is a block diagram of an information processing device according to a fourth exemplary embodiment of the present invention.

With reference to FIG. 12, an information processing device 40 according to a fourth exemplary embodiment of the present invention has a plurality of processors 41, a shared memory 43, and a network 42 connecting the plurality of processors 41 with the shared memory 43.

Each of the processors 41 includes a cache 44, a memory access control part 46 which controls an access to the shared memory 43 by the processor 41, and an invalidation request control part 45 which performs a process to invalidate the cache 44 on the basis of an invalidation request by the shared memory 43.

The shared memory 43 has execution counters 49 each counting the number of completed Store instructions. The execution counters 49 are given so as to be associated with the processors 41 one to one. On receiving a Store instruction issued by a Release side processor 41 which writes data, the shared memory 43 transmits a cache invalidation request to the invalidation request control part 45 of an Acquire side processor 41 which reads data, and also increases the value of the execution counter 49. Moreover, the shared memory 43 transmits a count value of the execution counter 49 to the Release side processor 41 asynchronously with the receiving of the Store instruction.

The memory access control part 46 of the Release side processor 41 has a store counter 47 and a wait counter 48. When issuing a Store instruction to the shared memory 43, the store counter 47 increases its value and, when receiving the count value of the execution counter 49 from the shared memory 43, the store counter 47 decreases its value by the count value of the execution counter 49. In a case where the store counter 47 is 0, the wait counter 48 sets a value indicating a predetermined time, and decreases its value per unit time. The predetermined time is set so that a time for transmission of the count value of the execution counter 49 by the shared memory 43, writing of a flag into the shared memory 43 by the Release side processor 41 after the predetermined time and reading of the flag by the Acquire side processor 41 becomes larger than a time for completion of a cache invalidation process by the Acquire side processor 41 after transmission of an invalidation request by the shared memory 43.

Further, when the store counter 47 and the wait counter 48 have become 0, the memory access control part 46 of the Release side processor 41 issues a Store Fence instruction to request for guaranteeing completion of invalidation of the cache 44 of the Acquire side processor 41.

On the other hand, after a process to invalidate the cache 44 is completed on the basis of an invalidation request from the shared memory 43, the memory access control part 46 of the Acquire side processor 41 issues a Load Fence instruction to guarantee completion of invalidation of the cache 44 in response to the Store Fence instruction.

Thus, according to this exemplary embodiment, it is possible to reduce load on a network connecting a plurality of processors with a shared memory, and also guarantee the global visibility of an invalidation request to an Acquire side processor at the time of a memory order guarantee based on the release consistency model. This is because the shared memory has an execution counter which counts the number of completed Store instructions and, on receiving a Store instruction issued by a Release side processor which writes data, transmits a cache invalidation request to an invalidation request control part of the Acquire side processor that writes data, and also increases the value of the execution counter and transmits a count value of the execution counter to the Release side processor asynchronously with the receiving of the Store instruction. By thus transmitting the value of the execution counter to the processor at a time unrelated to the receiving of the Store instruction, an event that one execution counter value is transmitted every time one Store instruction is received does not always occur. In a case where Store instructions are frequently issued, an event that one execution counter value of 2 or more is transmitted for a plurality of Store instructions can occur. Consequently, load on the network is reduced.

Although the present invention has been described above with the use of some exemplary embodiments, the present invention is not limited to the exemplary embodiments described above. The configurations and details of the present invention can be altered and changed in various manners that can be understood by one skilled in the art within the scope of the present invention.

The present invention can be utilized for general information processing devices guaranteeing the global visibility of an invalidation request to an Acquire side processor at the time of a memory order guarantee based on the release consistency model.

DESCRIPTION OF REFERENCE NUMERALS 1 processor
1-1 to 1-M processor
2 processor-to-memory network
3-1 to 3-N memory bank
4 shared memory
10 information processing device
11 instruction control part
12 cache
13 invalidation request control part
14 memory access control part
15 store counter
16 wait counter
31 directory
32 memory
33 memory control part
34-1 to 34-M execution counter
35 storage part
40 information processing device
41 processor
42 network
43 shared memory
44 cache
45 invalidation request control part
46 memory access control part
47 store counter
48 wait counter
49 execution counter
50 computer device
52 memory
53 storage device
54 interface
55 bus
56 input device
57 output device
58 recording medium
L1 instruction control part

The invention claimed is:

1. An information processing device having a plurality of processors, a shared memory, and a network connecting the plurality of processors with the shared memory, wherein:
each of the processors includes a cache, a memory access control unit configured to control an access from the processor to the shared memory, and an invalidation request control unit configured to execute an invalidation process on the cache on a basis of an invalidation request by the shared memory;
the shared memory has an execution counter configured to count a number of completed Store instructions;
the shared memory is configured to: on receiving a Store instruction issued by the processor on a Release side which writes data, transmit a request for invalidation of the cache to the invalidation request control unit of the processor on an Acquire side which reads data and also increase a value of the execution counter; and transmit a count value of the execution counter to the Release side processor asynchronously with the receiving of the Store instruction;

the memory access control unit of the Release side processor includes a store counter and a wait counter, the store counter being configured to increase its value when a Store instruction is issued to the shared memory and, when a count value of the execution counter is received from the shared memory, decrease its value by the count value of the execution counter, the wait counter being configured to, when the store counter has come to indicate 0, set a value indicating a predetermined time and decrease its value every unit time, the predetermined time being set so that a time from writing of a flag into the shared memory by the Release side processor after the predetermined time to reading of the flag by the Acquire side processor becomes larger than a time from transmission of the invalidation request by the shared memory to completion of the invalidation process on the cache in the Acquire side processor;
the memory access control unit of the Release side processor is configured to issue a Store Fence instruction to request for a guarantee of completion of invalidation of the cache of the Acquire side processor when the store counter and the wait counter have come to indicate 0; and
the memory access control unit of the Acquire side processor is configured to, after completion of the invalidation process on the cache on a basis of the invalidation request by the shared memory, issue a Load Fence instruction to guarantee completion of invalidation of the cache in response to the Store Fence instruction.

2. The information processing device according to claim 1, wherein the shared memory is configured to, for transmission of a count value of the execution counter to the Release side processor, add the count value of the execution counter to a reply from the shared memory to the Release side processor.

3. The information processing device according to claim 1, wherein the shared memory is configured to transmit a count value of the execution counter to the Release side processor when load on the network is small.

4. The information processing device according to claim 1, wherein:
the memory access control unit of the Release side processor is configured to, when the Store Fence instruction is detected, transmit a Store Fence detection notification to the shared memory; and
the shared memory is configured to, on receiving the Store Fence detection notification, transmit a count value of the execution counter to the Release side processor.

5. The information processing device according to claim 1, wherein the shared memory is configured to transmit a count value of the execution counter to the Release side processor in a case where a request by the Release side processor is absent for a predetermined time.

6. A memory order guarantee method, comprising:
with a use of a shared memory, on receiving a Store instruction issued by a processor on a Release side which writes data, transmitting a request for invalidation of a cache to a processor on an Acquire side which reads data and also increasing a value of an execution counter, and transmitting a count value of the execution counter to the Release side processor asynchronously with the receiving of the Store instruction;
with a use of the Release side processor, issuing a Store Fence instruction to request for a guarantee of completion of invalidation of the cache of the Acquire side processor when a store counter and a wait counter have come to indicate 0, the Release side processor including the store counter and the wait counter, the store counter being configured to increase its value when the Store instruction is issued to the shared memory and, when a count value of the execution counter is received from the shared memory, decreasing its value by the count value of the execution counter, the wait counter being configured to, when the store counter has come to indicate 0, set a value indicating a predetermined time and decrease its value every unit time, the predetermined time being set so that a time from writing of a flag into the shared memory by the Release side processor after the predetermined time to reading of the flag by the Acquire side processor becomes larger than a time from transmission of the invalidation request by the shared memory to completion of the invalidation process on the cache in the Acquire side processor; and with a use of the Acquire side processor, after completion of the invalidation process on the cache on a basis of the invalidation request by the shared memory, issuing a Load Fence instruction to guarantee completion of invalidation of the cache in response to the Store Fence instruction.

7. The memory order guarantee method according to claim 6, comprising, in the transmitting of a count value of the execution counter to the Release side processor, adding the count value of the execution counter to a reply by the shared memory to the Release side processor.

8. The memory order guarantee method according to claim 6, comprising, in the transmitting of a count value of the execution counter to the Release side processor, transmitting the count value of the execution counter to the Release side processor when load on the network is small.

9. The memory order guarantee method according to claim 6, further comprising:

with a use of the Release side processor, on detecting the Store Fence instruction, transmitting a Store Fence detection notification to the shared memory; and with a use of the shared memory, on receiving the Store Fence detection notification, transmitting a count value of the execution counter to the Release side processor.

10. The memory order guarantee method according to claim 6, further comprising, with a use of the shared memory, transmitting a count value of the execution counter to the Release side processor in a case where a request by the Release side processor is absent for a predetermined time.

11. A non-transitory computer-readable medium storing a computer program comprising instructions for causing a computer to perform operations including:

with a use of a shared memory, on receiving a Store instruction issued by a processor on a Release side which writes data, transmitting a request for invalidation of a cache to a processor on an Acquire side which reads data and also increasing a value of an execution counter, and transmitting a count value of the execution counter to the Release side processor asynchronously with the receiving of the Store instruction;

with a use of the Release side processor, issuing a Store Fence instruction to request for a guarantee of completion of invalidation of the cache of the Acquire side processor when a store counter and a wait counter have come to indicate 0, the Release side processor including the store counter and the wait counter, the store counter being configured to increase its value when the Store instruction is issued to the shared memory and, when a count value of the execution counter is received from the shared memory, decreasing its value by the count value of the execution counter, the wait counter being configured to, when the store counter has come to indicate 0, set a value indicating a predetermined time and decrease its value every unit time, the predetermined time being set so that a time from writing of a flag into the shared memory by the Release side processor after the predetermined time to reading of the flag by the Acquire side processor becomes larger than a time from transmission of the invalidation request by the shared memory to completion of the invalidation process on the cache in the Acquire side processor; and with a use of the Acquire side processor, after completion of the invalidation process on the cache on a basis of the invalidation request by the shared memory, issuing a Load Fence instruction to guarantee completion of invalidation of the cache in response to the Store Fence instruction.

* * * * *